W. T. CULLIFER.
INSECT DESTROYER.
APPLICATION FILED AUG. 9, 1916.
1,209,814.
Patented Dec. 26, 1916.
2 SHEETS—SHEET 1.
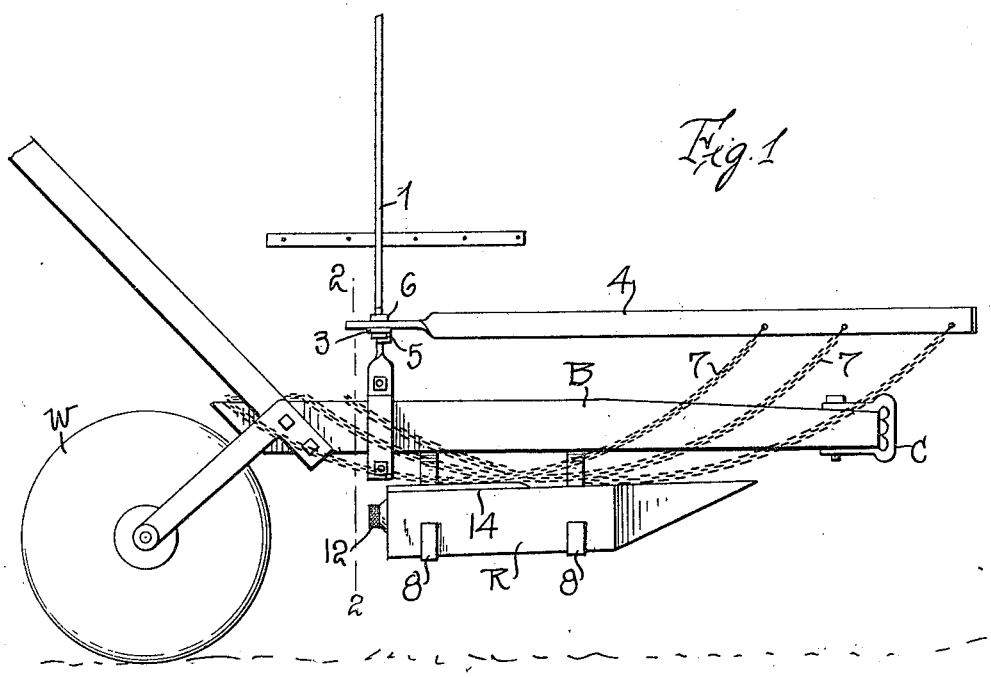
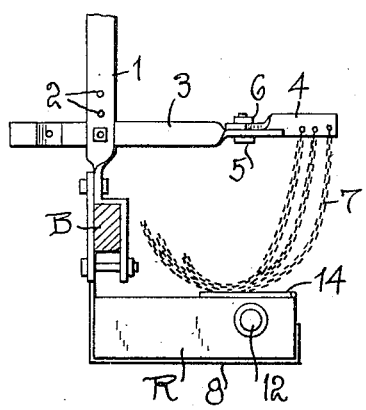
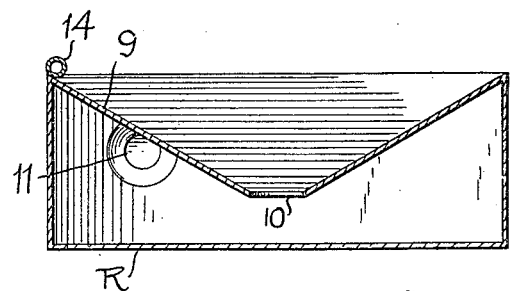
Inventor
W. T. CULLIFER
By Watson E. Coleman
Attorney

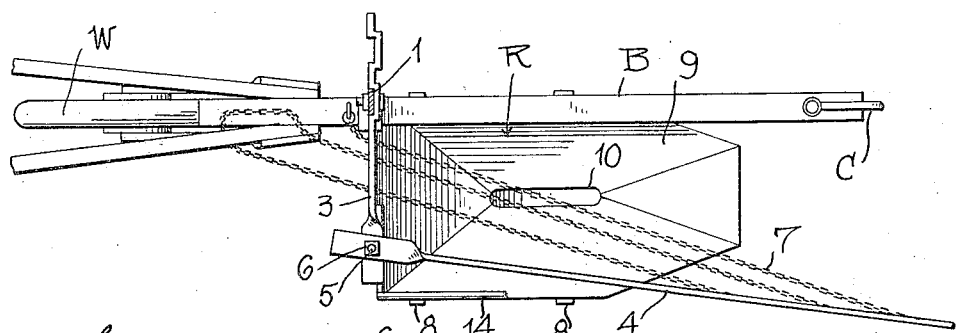
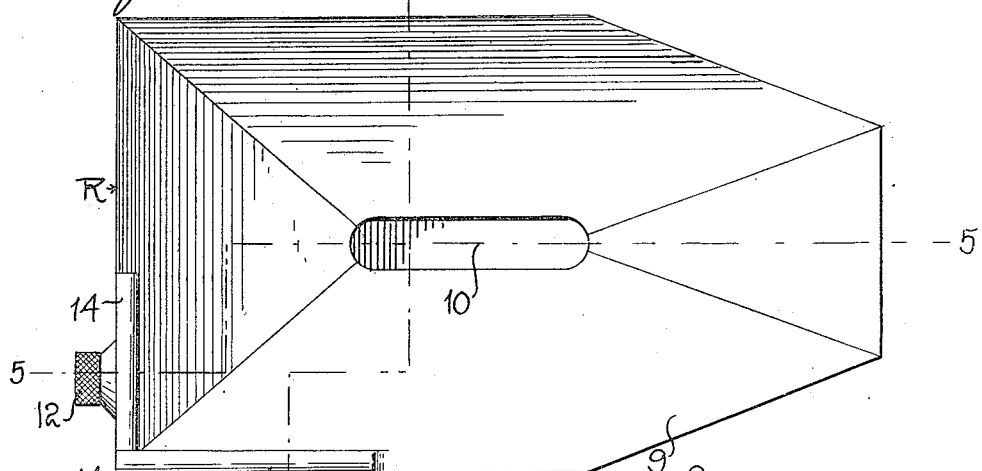

UNITED STATES PATENT OFFICE.

WALTER T. CULLIFER, OF OZARK, ALABAMA, ASSIGNOR OF ONE-HALF TO SMITH & CO., A FIRM COMPOSED OF H. R. SMITH AND J. A. SMITH, OF OZARK, ALABAMA.

INSECT-DESTROYER.

1,209,814.　　　　　Specification of Letters Patent.　　Patented Dec. 26, 1916.

Application filed August 9, 1916.　Serial No. 113,987.

*To all whom it may concern:*

Be it known that I, WALTER T. CULLIFER, a citizen of the United States, residing at Ozark, in the county of Dale and State of Alabama, have invented certain new and useful Improvements in Insect-Destroyers, of which the following is a specification, reference being had to the accompanying drawings.

This invention relates to certain improvements in insect destroyers and has relation more particularly to a device of this general character especially designed and adapted for use in connection with boll weevils; and it is an object of the invention to provide a novel and improved device of this general character whereby the insects together with punctured squares may be knocked from the plants or collected within a receptacle adapted to contain an exterminating solution.

The invention also has for an object to provide a novel and improved device of this general character including a flexible striking member having positioned therebeneath a collecting receptacle, said striking member serving to bend the plants to a position above the receptacle and vibrate the plant sufficiently to knock therefrom the boll weevil or punctured squares thereon so that the same may be collected within the receptacle.

The invention consists in the details of construction and in the combination and arrangement of the several parts of my improved insect destroyer whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a side elevational view of an insect destroyer constructed in accordance with an embodiment of my invention; Fig. 2 is a sectional view taken substantially on the line 2—2 of Fig. 1; Fig. 3 is a view in top plan of the device as herein embodied; Fig. 4 is an enlarged view in top plan of the collecting receptacle as herein disclosed; Fig. 5 is a sectional view taken substantially on the line 5—5 of Fig. 4; and Fig. 6 is a sectional view taken substantially on the line 6—6 of Fig. 4.

As disclosed in the accompanying drawings, B denotes a beam of conventional construction provided at one end with a supporting wheel W and having its opposite or forward end provided with a clevis C whereby a draft animal may be hitched thereto.

Suitably anchored to the rear portion of the beam B is an upright 1 of predetermined dimensions and provided with a series of longitudinally spaced openings 2 to afford an adjustable connection with the horizontally disposed arm 3 of predetermined dimensions and extending laterally beyond one side of the beam B. The outer or free end portion of the arm 3 has engaged therewith the horizontally disposed arm 4 extending substantially longitudinally of the beam B and disposed on a predetermined incline. As herein embodied, the connection between the arms 3 and 4 is afforded through the medium of the clamping bolt 5 and its coacting nut 6, whereby it will be perceived that the inclination of the arm 4 relative to the beam B may be varied in accordance with the requirements of practice.

The forward or free end portion of the arm 4 has secured thereto at predetermined longitudinally spaced points the extremities of the flexible members 7 herein disclosed as linked chains which are disposed rearwardly and suitably anchored to the rear portion of the beam B.

It will be perceived that as the beam B is caused to travel forwardly the flexible members or chains 7 will contact with the plants and cause the same to bend over in a direction toward the beam and also impart sufficient vibration to said plants as to knock therefrom boll weevil or punctured squares which may be carried thereby. The insects and punctured squares knocked from the plants are adapted to be collected within the receptacle R. This receptacle is substantially rectangular in top plan and is supported by the beam B at the point below the flexible members or chains 7 through the medium of the brackets 8 and the top 9 of the receptacle R is inclined downwardly from its margins toward the center thereof, and the lowermost portion or central portion of said top 9 is provided with the elongated opening 10 whereby it will be perceived that the insects or punctured squares after falling upon the top 9 of the receptacle R will roll downwardly and within the receptacle through said opening. The receptacle R is adapted to contain any desired solution which will exterminate or kill the insects and in practice I prefer to employ a solution of kerosene and water as I have found in practice that a solution of this character affords the desired result.

One end wall of the receptacle R is provided with an opening 11 adapted to be closed by a screw cap 12 or the like. This opening 11 serves as a discharge for the contents of the receptacle R when the requirements of practice may dictate. I also have found it of particular advantage to provide the outer and rear marginal portions of the top 9 of the receptacle R with the rolled flanges 14 to prevent the plants from sweeping the insects or punctured squares from off the top as the receptacle passes therebeneath.

From the foregoing description, it is thought to be obvious that an insect destroyer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with a beam, an upright carried thereby, an arm operatively engaged with the upright and extending laterally from the beam, a second arm pivotally engaged with the outer extremity of the first named arm whereby the outer extremity of said second named arm may be adjusted relative to the beam, a plurality of flexible striking members secured to the forward end portion of the second named arm and to the rear portion of the beam, and a collecting receptacle carried by the beam and positioned below the striking members.

2. In combination with a beam, an upright carried thereby, an arm operatively engaged with the upright and extending laterally from the beam, a second arm pivotally engaged with the outer extremity of the first named arm whereby the outer extremity of said second named arm may be adjusted relative to the beam, a plurality of striking members secured to the forward end portion of the second named arm and to the beam rearwardly of the upright carried by the beam, and a collecting receptacle carried by the beam and positioned below the striking members at a point in advance of the upright.

In testimony whereof I hereunto affix my signature in the presence of two witnesses.

WALTER T. X CULLIFER.
his mark

Witnesses:
H. N. SEAY,
H. R. SMITH.

Copies of this patent may be obtained for five cents each, by addressing the "Commissioner of Patents, Washington, D. C."